United States Patent [19]

Hibl et al.

[11] 3,905,508

[45] Sept. 16, 1975

[54] CRYOGENIC TANK SUPPORT SYSTEM

[75] Inventors: Joseph J. Hibl; Harold E. Sutton, both of Boulder, Colo.

[73] Assignee: Beech Aircraft Corporation, Wichita, Kans.

[22] Filed: July 5, 1973

[21] Appl. No.: 376,730

[52] U.S. Cl. ............................... 220/15; 220/9 LG
[51] Int. Cl.² .......................................... F17C 13/08
[58] Field of Search ............ 220/9 LG, 9 C, 10, 14, 220/15; 280/5 R, 5 A, 56; 62/45

[56] References Cited
UNITED STATES PATENTS

| | | | |
|---|---|---|---|
| 2,925,934 | 2/1960 | Hampton et al. | 220/15 |
| 3,132,762 | 5/1964 | Gabarro et al. | 220/15 |
| 3,157,147 | 11/1964 | Ludwig | 220/15 |
| 3,163,313 | 12/1964 | Reynolds et al. | 220/15 |
| 3,217,920 | 11/1965 | Holben | 220/15 |
| 3,341,215 | 9/1967 | Spector | 220/15 |
| 3,425,585 | 2/1969 | Latham | 220/15 |
| 3,487,971 | 1/1970 | Kirgis et al. | 220/15 |
| 3,764,036 | 10/1973 | Dale et al. | 220/15 |
| 3,782,128 | 1/1974 | Hampton et al. | 220/15 |

Primary Examiner—William I. Price
Assistant Examiner—Stephen Marcus
Attorney, Agent, or Firm—Edward L. Brown, Jr.

[57] ABSTRACT

The invention is a multi-stage support system between the inner and outer vessels of a cryogenic fluid tank. Under low inertial loads the inner vessel is supported in the outer vessel by a flexible beam having low thermal conductivity so as to minimize the heat transfer through the tank. A second stage support engages the inner vessel only after the beam has sufficiently deflected due to increased inertial loadings.

14 Claims, 6 Drawing Figures

CRYOGENIC TANK SUPPORT SYSTEM

BACKGROUND OF THE INVENTION

In storing and transporting of cryogenic fluids they must be maintained at extremely low temperatures to prevent their evaporation. Dewar-type tanks which perform this function are formed by an inner and outer vessel with an evacuated space therebetween which also contains some type of insulation or shielding. The inner vessel is connected to the outer vessel by some type of supporting means having as high thermal efficiency as possible. The prior art supporting systems have followed a wide range of approaches from the usage of highly insulated materials to stainless steel wires. Since the support system must be designed to handle the maximum loads which that cryogenic tank will experience, the thermal efficiency of the support system is substantially comprimised. This problem brought about the concept of a dual-stage supporting system, the first stage for handling light loads being highly efficient, thermally speaking, while the second stage system for maximum loads experienced being less thermally efficient. This two-stage concept utilized in outer space applications is illustrated in U.S. Pat. No. 3,211,318 to Bleyle and U.S. Pat. No. 3,487,971 to Kirgis et al. In the first patent mentioned the second stage heavy load system is brought into engagement by pressurizing a certain chamber and actually moving the second stage support into engaging position. The second mentioned patent to Kirgis et al., which has a common assignee with the present invention, utilizes two separate compressive fibrous pads, the first pad supporting the inner vessel under light loads and having a high thermal efficiency. Under increased loadings, the first pad compresses bringing into contact the second moe dense pad which supports higher loads and in turn is less efficient thermally.

Due to the current pollution problems with automobile and truck exhausts, the cryogenic tank of the present invention was designed as a fuel tank for liquefied natural gas generally referred to as LNG. The design requirements of these tanks require a certain degree of thermal efficiency while the vehicle is not in use and also that the tank be able to withstand certain maximum shock loadings which might to experienced in collision or under severe shock loading. To achieve these design paramaters the present invention incorporates a multi-stage support system incorporating two or more separate support means with each of the support means providing support up to a specific level of loading. When the level of loading of the first support means is exceeded, support of the excess load is provided by the second stage support means which is brought into engagement by deflection of the first support means. While the drawings only illustrate a two and three-stage support system, the concept can be extended to whatever number of stages would be desirable for the specific application.

It is therefore the principal object of the present invention to provide a multi-stage supporting system for varying inertial loads with the thermal efficiency of each successive supporting stage decreasing with an increase in the load.

A further object of the present invention is to provide a vehicular LNG tank whose thermal efficiency is automatically varied in accordance with the use of the vehicle.

A further object of the present invention is to provide a highly efficient vehicular LNG tank which is relatively simple to assemble and build.

Further objects and advantages of the invention will be apparent when the following description is read in connection with the accompanying drawings, in which.

Figure 1:
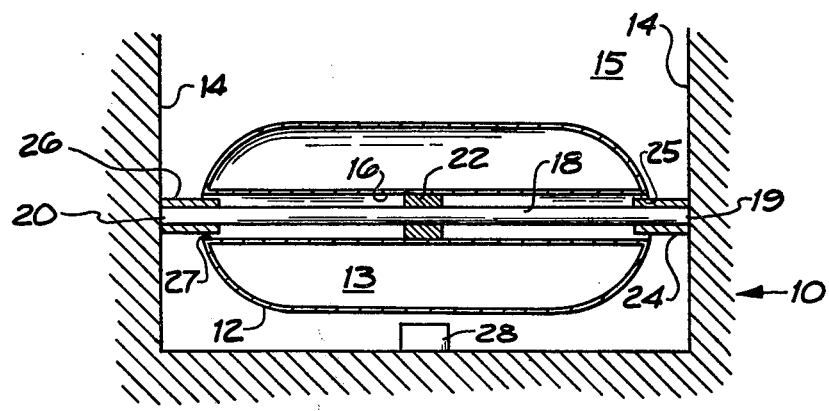
FIG. 1 is a longitudinal section of a multi-stage support system between the vessels of a cryogenic tank which embodies the present invention.

Referring now to FIG. 1 of the drawings, which illustrates the basic configuration of the present invention, reference numeral 10 generally identifies a cryogenic tank assembly. The tank 10 is made up of an inner vessel 12 having a generally cylindrical shape. The outer vessel 14 of the tank surrounds the inner vessel with an area 15 therebetween which is evacuated by conventional means. In actual shape, the outer vessel 14 is also cylindrical and similar in shape to the inner vessel 12 but for purposes of simplification in all the drawings, the outer vessel is merely symbolically shown. The vessels 12 and 14 can be constructed of materials such as stainless steel, aluminum, titanium and a variety of reinforced plastics. Passing through the longitudinal center of the inner vessel 12 is an opening 16 which receives a tubular beam 18 anchored at its ends 19 and 20 to the outer vessel 14. Beam 18 can be constructed of fiberglass, stainless steel, graphite reinforced plastic, or any other material having a low thermal conductivity. Centrally disposed support sleeve 22, on beam 18, carries the inner vessel 12. Sleeves 24 and 26 which are also of a low thermal conductivity are concentrically disposed over the ends of beam member 18 and separately anchored to the outer vessel 14. Compressive support member 28, which acts as a third stage, supports the inner vessel 12 when they come in contact with each other. The third stage support can also be omitted.

The entry and exhaust lines for filling the inner vessel 12 with cryogenic fluid are not shown in the drawings since they are not a part of the present invention.

FIGURE 1 OPERATION

When the vehicle containing the tank 10 is parked or not in use, the inner vessel 12 is supported solely by beam 18 at its mid-point through sleeve 22. Beam 18 which is the first stage support, is a relatively flexible thin-walled tube which easily deflects under load. When the vehicle is in use, the inertial loads on the tank 10 will increase and vary under differing circumstances. Under an increased inertial load the tubular beam 18 deflects, bringing the ends 25 and 27 of the inner vessel 12 into contact with sleeves 24 and 26, which make up the second stage support system. Sleeves 24 and 26 have a larger cross-sectional area and size to carry the higher load levels of the second stage. When the vehicle experiences maximum design loads, such as might be involved in a collision, the first and second stage supports 18, 24 and 26 deflect sufficiently so that third stage support member 28 comes in contact with and engages inner vessel 12. While the second and third stage supports can handle increased loads, they also are less thermally efficient than the elongated tube 18. Since the interval of time the vehicle experiences the last mentioned higher load levels is quite small, the overall thermal efficiency of the tank is quite high since it is being principally supported by the beam 18. While a single support sleeve is shown in the drawing in the middle of beam 18, a pair of sleeves can be utilized or a sleeve of longer length to decrease the loadings on the sleeve 22. It is also desirable from a standpoint of thermal efficiency to have the freestanding portion of tube 18 as long as possible between sleeve 22 and the outer vessel 14.

Figure 2:
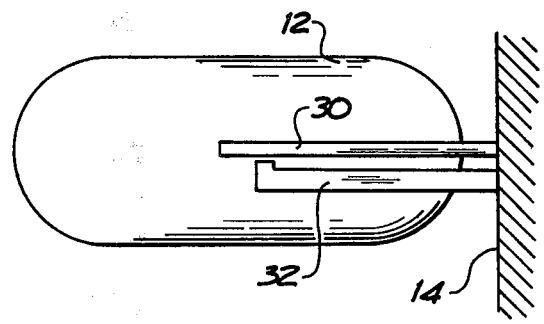
FIG. 2 is a modified form of the present invention with the first and second stage supports being cantilevered beams.

FIG. 2 is a modified form of the invention showing a two-stage support system utilizing a first cantilevered beam 30 for the first stage support and a more rigid cantilevered beam 32 which comes in contact with the more flexible first-stage beam 30 under increased loads.

Figure 3:
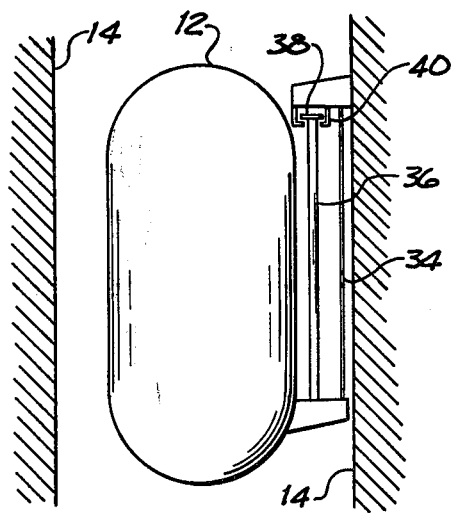
FIG. 3 is a further modification of the present invention with the first and second stage supports being members in tension.

FIG. 3 illustrates a further embodiment wherein the first-stage support is a very small diameter wire 34 in tension which under increased loads stretches to the point where the head 38 of second-stage support rod 36 comes in contact with bracket 40 on the outer vessel 14 thereby putting second-stage rod 36 in tension.

Figure 4:
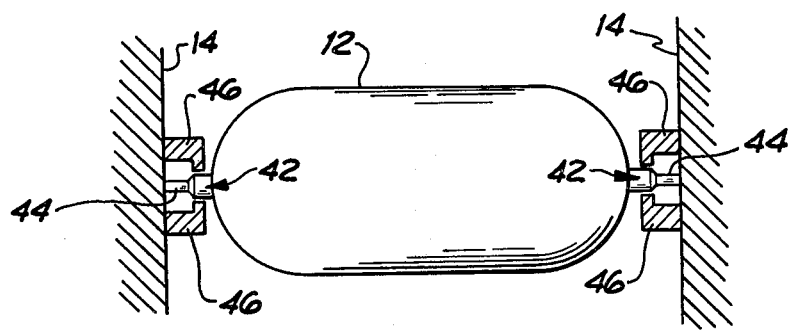
FIG. 4 is a further modified form of the invention with the first and second stages acting in bending and shear.

FIG. 4, a further embodiment of the dual stage support system, is illustrated by the support members 42 supporting opposite ends of the inner vessel 12 in bending and shear. The reduced diameter portion 44 of member 42 functions as the first stage. Under increased loads, the reduced diameter portion 44 deforms under bending and shear until member 46, which is the second stage, is contacted.

Figure 5:
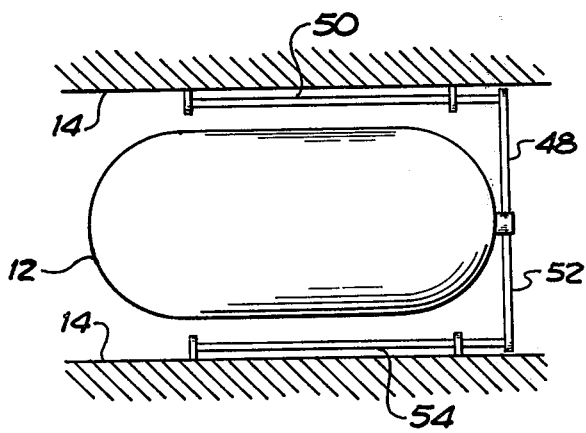
FIG. 5 is a further modification of the invention with the first and second stages acting in torsion.
Figure 6:
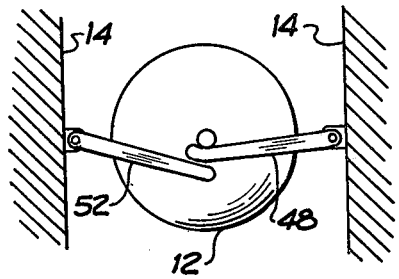
FIG. 6 is an end view of FIG. 5.

FIGS. 5 and 6 illustrate a further embodiment, with the inner vessel 12 initially supported by a lever arm 48 which is in turn connected to a first stage torsional member 50. Under increased loadings, the torsional member 50 deflects allowing the inner vessel 12 to come in contact with the second lever arm 52 which is in turn connected to a second stage torsional member 54.

Having described the invention with sufficient clarity to enable those familiar with the art to construct and use it, we claim:

1. A tank for storing and transporting cryogenic fluids under varying inertial loads comprising the combination of:
    an inner vessel adapted to contain cryogenic fluids;
    an outer vessel substantially surrounding the inner vessel and defining therewith a vauum-tight insulated space around the inner vessel;
    a multi-stage supporting system including a first support means comprising a beam of flexible insulative material supporting the inner vessel within the outer vessel under low inertial loads; and
    a second support means of insulative material located between the vessels for high inertial loads, said second support means engaging only when the inertial load on the tank is sufficient to cause the first support means to reach a certain point of deflection, at which point the second support means provides positive support between the vessels for any additional inertial loads.

2. A tank for storing and transporting cyrogenic fluids as set forth in claim 1 wherein, the first support means is a beam passing longitudinally through the center of the inner vessel supporting the inner vessel inwardly from its outer ends, while ends of the beam are attached to the outer vessel.

3. A tank for storing and transporting cryogenic fluids as set forth in claim 1, wherein the first support means is a beam passing longitudinally through the center of the inner vessel at its approximate center while at least one end of the beam is attached to the outer vessel.

4. A tank for storing and transporting cryogenic fluids as set forth in claim 1, wherein the first support means is a beam attached to the inner vessel at one end and the outer vessel at the other end.

5. A tank for storing and transporting cryogenic fluids as set forth in claim 1, wherein the first support means is a beam passing longitudinally through the center of the inner vessel supporting the inner vessel inwardly from its outer ends, while ends of the beam are attached to the outer vessel and the second support means includes two members attached to the outer vessel concentrically positioned with respect to said beam, approximate the ends of the inner vessel, the second support means when engaged acting as a cantilevered beam.

6. A tank for storing and transporting cryogenic fluids as set forth in claim 1, wherein the inner vessel has a longitudinal concentric open passage therethrough; the first support means comprises a simple beam passing through said passage connected at its end to the outer vessel and supporting the inner vessel at its approximate midpoint.

7. A tank for storing and transporting cryogenic fluids as set forth in claim 1, wherein the inner vessel has a longitudinal concentric open passage therethrough; the first support means comprises a simple beam of tubular cross-section made of fiberglass.

8. A tank for storing and transporting cryogenic fluids as set forth in claim 1, wherein the inner vessel has a longitudinal concentric open passage therethrough; the first support means comprises a simple beam of tubular cross-section, and the second support means vessel includes two sleeves attached to the outer vessel concentrically positioned on the tubular beam extending approximate the ends of the inner vessel, the second support means when engaged by the ends of the inner vessel acting as a cantilevered beam.

9. A tank for storing and transporting cryogenic fluids as set forth in claim 1, wherein the second support means is a beam acting in shear and bending.

10. A tank for storing and transporting cryogenic fluids as set forth in claim 1, including a third support means acting in compression between the vessels engaging only when the loads on the tank are sufficient to cause a certain deflection of the second support means.

11. A tank for storing and transporting cryogenic fluids as set forth in claim 1, wherein the first and second support means includes two cantilevered beams each acting in shear and bending.

12. A tank for storing and transporting cryogenic fluids as set forth in claim 1, wherein the first support means acts in shear.

13. A tank for storing and transporting cryogenic fluids as set forth in claim 1, wherein the first and second support means act in shear.

14. A support system between the inner and outer vessels of a dual-walled vacuum type cryogenic tank utilized under varying inertia loads comprising:

a first beam support member of flexible insulative material supporting the inner vessel within the outer vessel;

a second support member of insulative material between the vessels supporting the inner vessel within the outer vessel only under high inertia loads when the first support member has reached a predetermined point of deflection.

* * * * *